US012753908B2

(12) United States Patent
Liao et al.

(10) Patent No.: US 12,753,908 B2
(45) Date of Patent: Oct. 6, 2026

(54) HIGH LUMINOUS-EFFICACY INDUSTRIAL LIGHTING DEVICE

(71) Applicant: Xiamen PVTECH Co., Ltd., Xiamen (CN)

(72) Inventors: Sishan Liao, Xiamen (CN); Liangliang Cao, Xiamen (CN); Yanling Xiao, Xiamen (CN); Weibiao Zhong, Xiamen (CN); Haibo Hong, Xiamen (CN); Dejia Li, Xiamen (CN); Jinsheng Li, Xiamen (CN)

(73) Assignee: Xiamen PVTECH Co., Ltd., Xiamen (CN)

(*) Notice: Subject to any disclaimer, the term of this patent is extended or adjusted under 35 U.S.C. 154(b) by 0 days.

(21) Appl. No.: 19/277,445

(22) Filed: Jul. 23, 2025

(65) Prior Publication Data

US 2026/0029112 A1 Jan. 29, 2026

(30) Foreign Application Priority Data

Jul. 25, 2024 (CN) ......................... 202411009789.7

(51) Int. Cl.
*F21V 19/00* (2006.01)
*F21S 8/06* (2006.01)
(Continued)

(52) U.S. Cl.
CPC .......... *F21V 19/0035* (2013.01); *F21S 8/063* (2013.01); *F21V 5/048* (2013.01); *F21V 7/0066* (2013.01);
(Continued)

(58) Field of Classification Search
CPC .... F21V 19/0035; F21V 5/048; F21V 7/0066; F21V 7/0091; F21V 15/01; F21V 21/30;
(Continued)

(56) References Cited

U.S. PATENT DOCUMENTS

2012/0099326 A1* 4/2012 Hammond .............. F21S 43/14
438/27
2012/0106144 A1* 5/2012 Chang ....................... F21K 9/27
362/218
(Continued)

FOREIGN PATENT DOCUMENTS

CN 104696877 A 6/2015
CN 208687404 U * 4/2019
(Continued)

OTHER PUBLICATIONS

English translation of Luo CN-208687404-U (Year: 2019).*
Venture Lighting U-bracket for LED, available at https://www.venturelighting.com/ws/documents/user-manuals/bo0005-user-manual-ajustable-u-bracket.pdf (Year: 2022).*

*Primary Examiner* — Evan P Dzierzynski

(74) *Attorney, Agent, or Firm* — BruceStone LLP; Joseph A. Bruce

(57) ABSTRACT

A high luminous-efficacy industrial lighting device includes at least one lighting module. The lighting module includes a base, a light source board and a lens. The light source board is disposed on the base. The lens is disposed on the base and covers the light source board. The lens includes an optical module including a central portion and two side portions respectively disposed on the two sides of the central portion, such that an accommodation space is formed between the central portion and the side portions. The light source board is disposed within the accommodation space and faces the central portion.

8 Claims, 10 Drawing Sheets

(51) Int. Cl.

| | |
|---|---|
| ***F21V 5/04*** | (2006.01) |
| ***F21V 7/00*** | (2006.01) |
| ***F21V 15/01*** | (2006.01) |
| ***F21V 21/30*** | (2006.01) |
| *F21Y 115/10* | (2016.01) |

(52) U.S. Cl.
CPC ............ *F21V 7/0091* (2013.01); *F21V 15/01* (2013.01); *F21V 21/30* (2013.01); *F21Y 2115/10* (2016.08)

(58) Field of Classification Search
CPC . F21V 5/007; F21V 5/04; F21V 13/04; F21V 7/00; F21S 8/063; F21Y 2115/10; F21Y 2105/10; F21W 2131/103
See application file for complete search history.

(56) References Cited

U.S. PATENT DOCUMENTS

| | | | | |
|---|---|---|---|---|
| 2014/0198497 | A1* | 7/2014 | Shimizu .................... | F21K 9/27 362/249.06 |
| 2016/0348851 | A1* | 12/2016 | Amrine, Jr. ........... | F21V 23/023 |

FOREIGN PATENT DOCUMENTS

| | | | |
|---|---|---|---|
| CN | 211118937 | U | 7/2020 |
| CN | 216113459 | U | 3/2022 |
| KR | 20110008063 | U | 8/2011 |

* cited by examiner

HIGH LUMINOUS-EFFICACY INDUSTRIAL LIGHTING DEVICE

BACKGROUND OF THE INVENTION

1. Field of the Invention

The present invention relates to a lighting device, in particular to a high luminous-efficacy industrial lighting device.

2. Description of the Prior Art

Currently available mining lamps usually employ spherical lenses, which require injection molding for production. To ensure the curvature of the lens surface meets design requirements, an extended holding pressure time is necessary, which significantly increases manufacturing costs.

Additionally, the assembly process for spherical lenses is relatively complex. Whether using snap-fit installation or screw fastening, substantial labor is required, which further drives up production costs.

Moreover, insufficient holding pressure time during injection molding can greatly affect the light-emitting angle of spherical lenses while also compromising the brightness of mining lamps.

SUMMARY OF THE INVENTION

One embodiment of the present invention provides a high luminous-efficacy industrial lighting device, which includes at least one lighting module. The lighting module includes a base, a light source board and a lens. The light source board is disposed on the base. The lens is disposed on the base and covers the light source board. The lens includes an optical module including a central portion and two side portions respectively disposed on the two sides of the central portion, such that an accommodation space is formed between the central portion and the side portions. The light source board is disposed within the accommodation space and faces the central portion.

In one embodiment, the curvature of one side, adjacent to the light source board, of the central portion is less than the curvature of the other side of the central portion.

In one embodiment, each of the side portions includes a light entrance surface, a reflection surface, and a light exit surface. The light emitted from the light source board passes through the light entrance surface, is then reflected by the reflection surface, and exits through the light exit surface.

In one embodiment, the angle between the light entrance surface and a vertical reference line is less than the angle between the reflection surface and the vertical reference line.

In one embodiment, each of the side portions further includes a first connecting surface, a second connecting surface, and a third connecting surface. The first connecting surface is disposed between the light entrance surface and the reflection surface, and contacts the base. The second connecting surface is disposed between the light entrance surface and the light exit surface, and connected to the central portion. The third connecting surface is disposed between the reflection surface and the light exit surface.

In one embodiment, the lens further includes two curved arms. One of the curved arms is connected to the third connecting surface of one of the side portions, and the other curved arm is connected to the third connecting surface of the other side portion.

In one embodiment, the base includes a housing and a bottom plate connected to each other. A cavity is formed between the housing and the bottom plate, and the two sides of the housing are respectively engaged with the curved arms.

In one embodiment, the industrial lighting device further includes two side covers respectively disposed at the two ends of the base.

In one embodiment, the industrial lighting device further includes a suspension bracket. The two ends of the suspension bracket are respectively connected to the side covers.

In one embodiment, the industrial lighting device further includes two directional adjustment plates. The two ends of the suspension bracket are respectively connected to the side covers via the directional adjustment plates.

The high luminous-efficacy industrial lighting device in accordance with the embodiments of the present invention may have the following advantages:

(1) In one embodiment of the present invention, the industrial lighting device includes at least one lighting module. The lighting module includes a base, a light source board and a lens. The light source board is disposed on the base. The lens is disposed on the base and covers the light source board. The lens includes an optical module including a central portion and two side portions respectively disposed on the two sides of the central portion, such that an accommodation space is formed between the central portion and the side portions. The light source board is disposed within the accommodation space and faces the central portion. The curvature of one side, adjacent to the light source board, of the central portion is less than the curvature of the other side of the central portion. Each of the side portions includes a light entrance surface, a reflection surface, and a light exit surface. The light emitted from the light source board passes through the light entrance surface, is then reflected by the reflection surface, and exits through the light exit surface. As a result, the central portion achieves a light-condensing effect, while the side portions provide a reflective effect. Through this composite optical structure and the asymmetrical design of the central portion, the light-concentrating effect of the optical module is significantly improved, reducing optical loss and enabling uniform distribution of light emitted from the light source board onto a target area. Consequently, both the luminous efficacy and brightness of the industrial lighting device can be substantially enhanced.

(2) In one embodiment of the present invention, the lens of the lighting module includes an optical module, and each side portion of the optical module further includes a first connecting surface, a second connecting surface, and a third connecting surface. The first connecting surface is disposed between the light entrance surface and the reflection surface, and contacts the base. The second connecting surface is disposed between the light entrance surface and the light exit surface, and connected to the central portion. The third connecting surface is disposed between the reflection surface and the light exit surface. Through this structural design, the lens is securely fixed to the base, ensuring a predetermined distance between the central portion of the optical module and the light source board with a view to optimizing the performance of the composite optical structure.

(3) In one embodiment of the present invention, the lens of the lighting module includes two curved arms. One curved arm is connected to the third connecting surface of one side portion, while the other curved arm is connected to the third connecting surface of the other side portion. The base includes a housing and a bottom plate interconnected with each other. The two sides of the housing are respectively engaged with the two curved arms. This structural configuration provides a gap between the curved arms and the bottom plate, introducing flexibility during assembly to effectively compensate for manufacturing tolerances, improve assembly precision, and reduce labor requirements. Thus, the manufacturing cost of the industrial lighting device can be effectively reduced.

(4) In one embodiment of the present invention, the base of the lighting module includes a housing and a bottom plate connected with each other. A cavity is formed between the housing and the bottom plate to accommodate a power module, wiring, and other necessary components. The user can place additional components within the cavity based on practical needs. Therefore, the industrial lighting device can be more flexible in use and more comprehensive in application.

(5) In one embodiment of the present invention, the base of the lighting module comprises a housing and a bottom plate connected with each other. The housing surface is provided with a plurality of recesses, which significantly increase the heat dissipation area, thereby improving the heat dissipation effect of the lighting module. This design extends the service life of the industrial lighting device. Additionally, the recesses provide scratch-resistant properties, making scratches on the housing less noticeable. Thus, the industrial lighting device can meet actual requirements.

(6) In one embodiment of the present invention, the industrial lighting device further includes two side covers and two directional adjustment plates. The two side covers are respectively disposed at the two ends of the base, while the two ends of the suspension bracket are connected to the side covers via the directional adjustment plates. Through this structural design of the directional adjustment plates, the user can adjust the light-emitting angle of the industrial lighting device as needed. Accordingly, the industrial lighting device can conform the requirements of different applications.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
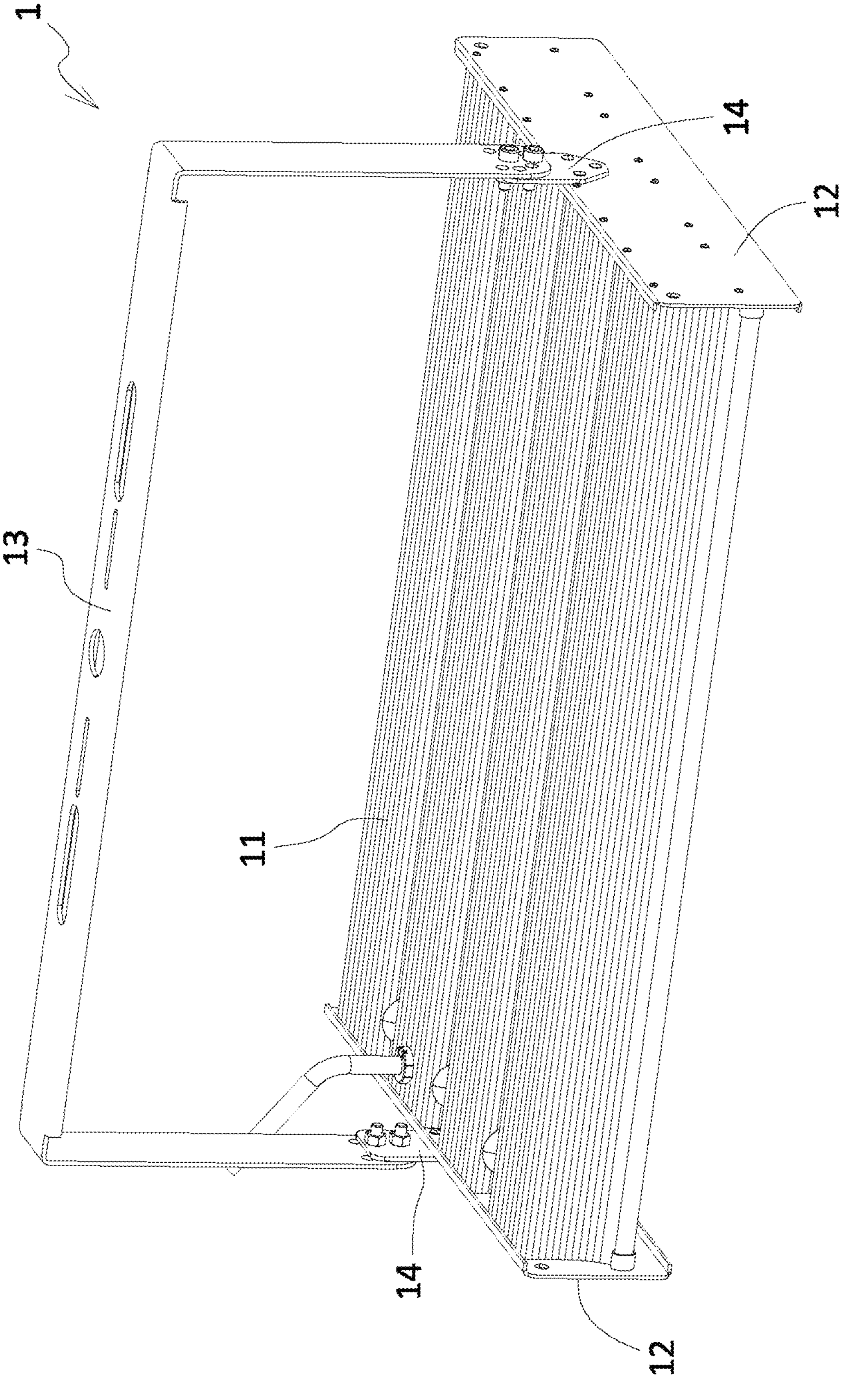
FIG. 1 is a perspective view of a high luminous-efficacy industrial lighting device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is “coupled” or “connected” to another element, the element may be “directly coupled” or “directly connected” to the other element or “coupled” or “connected” to the other element through a third element. In contrast, it should be understood that, when it is described that an element is “directly coupled” or “directly connected” to another element, there are no intervening elements.

Figure 2:
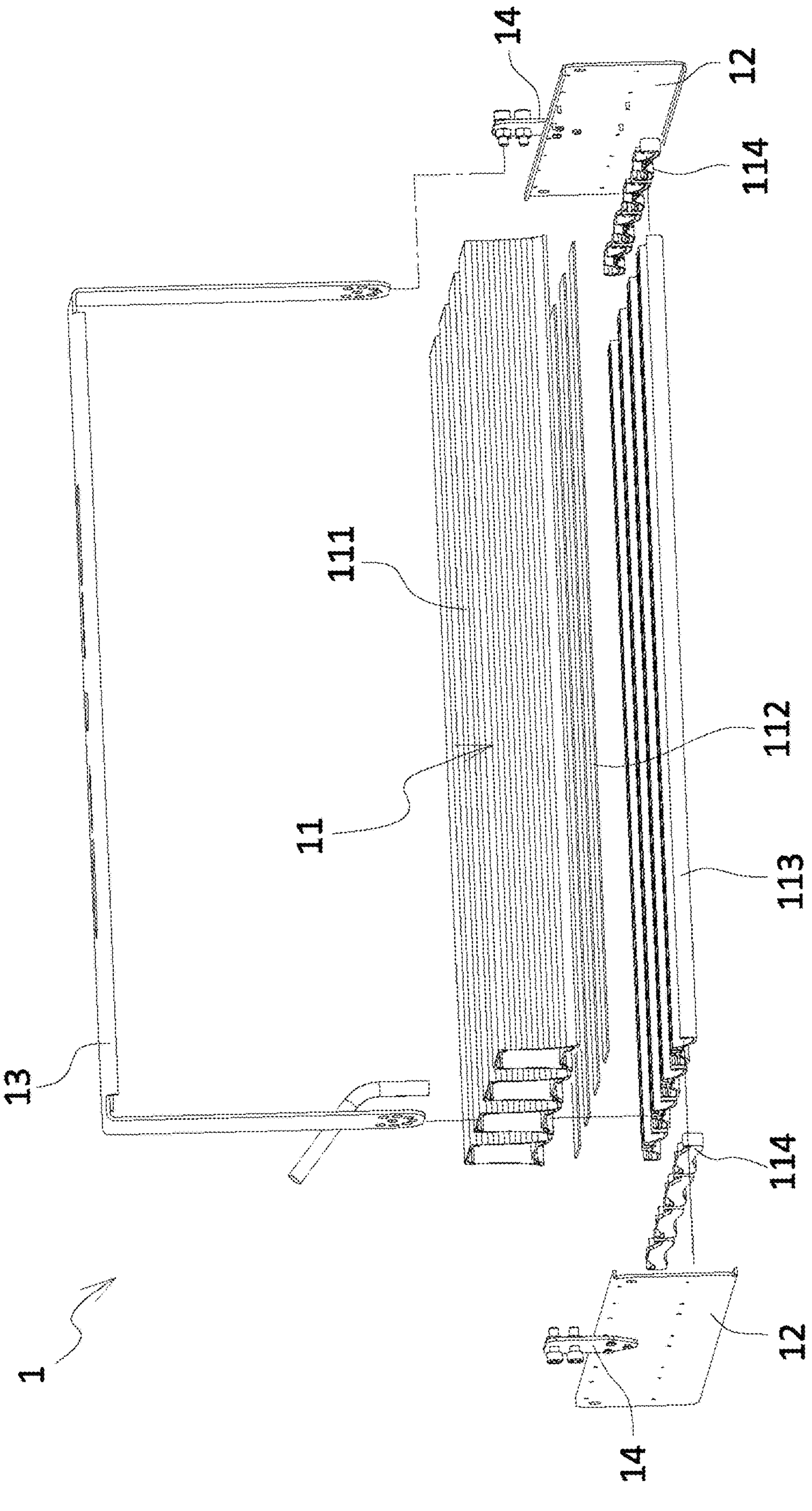
FIG. 2 is an exploded view of the high luminous-efficacy industrial lighting device in accordance with one embodiment of the present invention.
Figure 3:
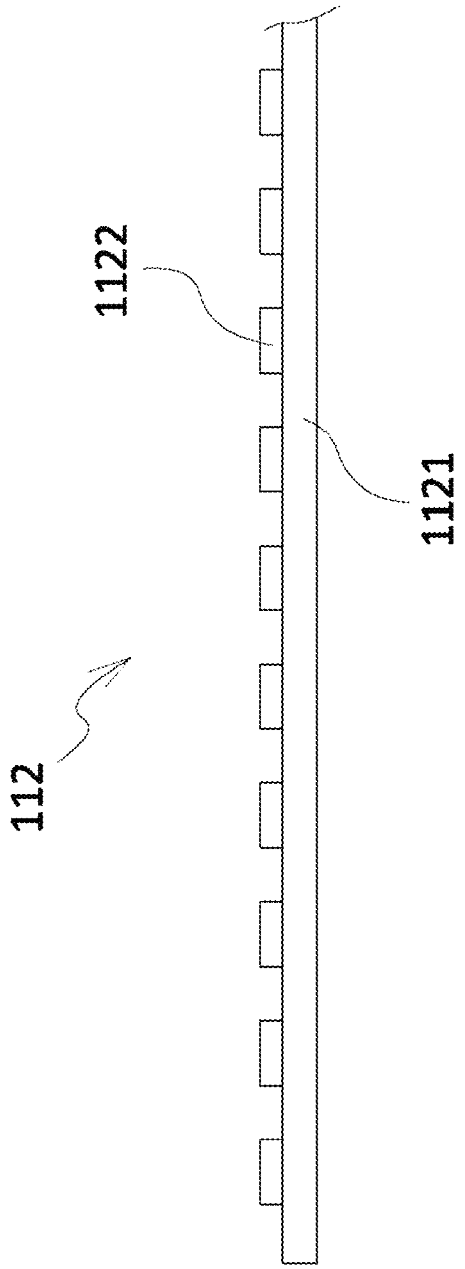
FIG. 3 is a side view of a light source board of the high luminous-efficacy industrial lighting device in accordance with one embodiment of the present invention.
Figure 4:
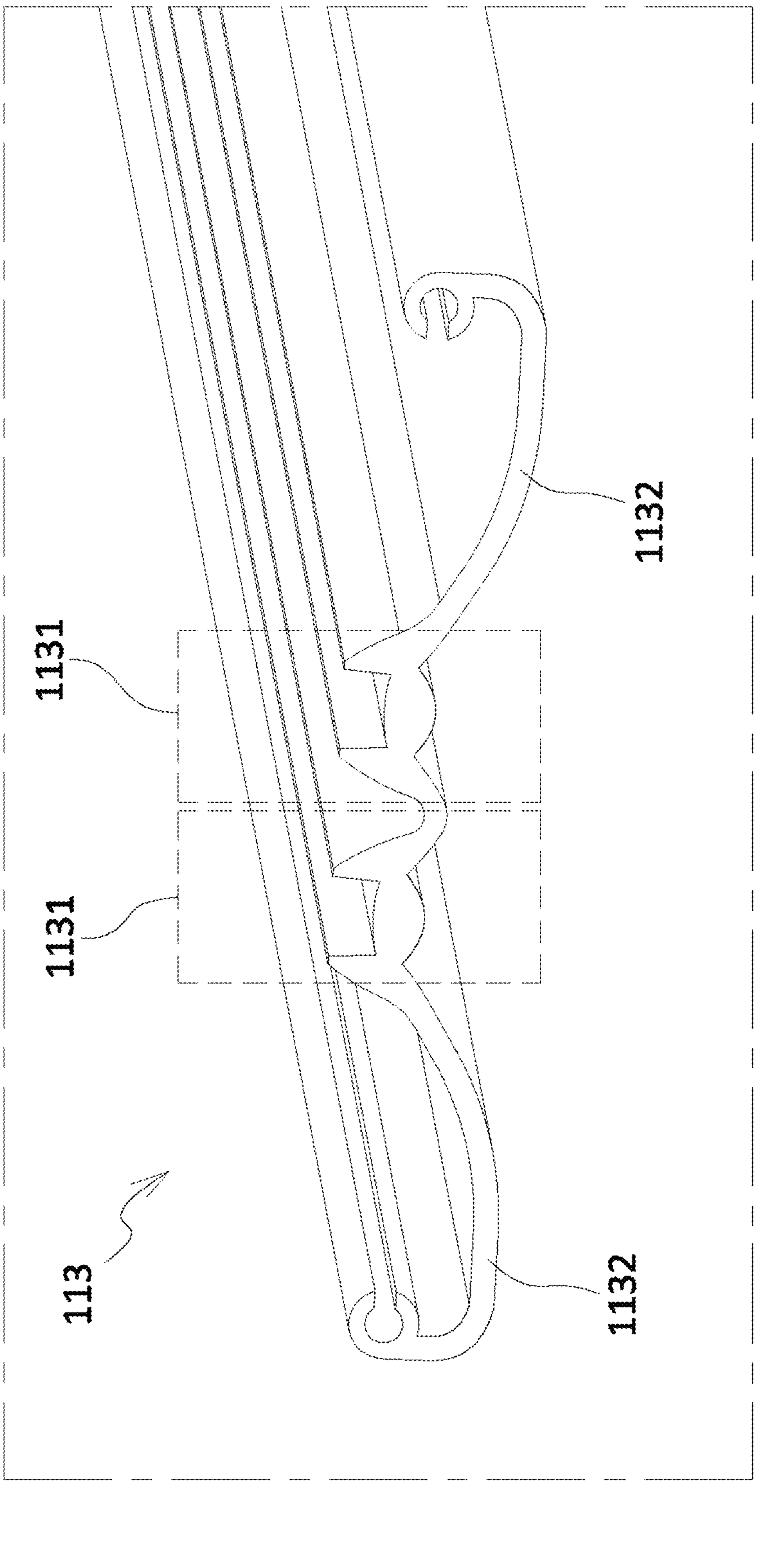
FIG. 4 is a perspective view of a lens of the high luminous-efficacy industrial lighting device in accordance with one embodiment of the present invention.

Please refer to FIG. 1, FIG. 2, FIG. 3, and FIG. 4. FIG. 1 is a perspective view of a high luminous-efficacy industrial lighting device in accordance with one embodiment of the present invention. FIG. 2 is an exploded view of the high luminous-efficacy industrial lighting device in accordance with one embodiment of the present invention. FIG. 3 is a side view of a light source board of the high luminous-efficacy industrial lighting device in accordance with one embodiment of the present invention. FIG. 4 is a perspective view of a lens of the high luminous-efficacy industrial lighting device in accordance with one embodiment of the present invention. As shown in FIG. 1, FIG. 2, FIG. 3, and FIG. 4, the industrial lighting device 1 includes a plurality of lighting modules 11, two side covers 12, a suspension bracket 13, and two directional adjustment plates 14. One end of each lighting module 11 is fixed to one side cover 12, and the other end is fixed to the other side cover 12. The two ends of the suspension bracket 13 are connected to the two side covers 12 via the two directional adjustment plates 14, respectively. In this embodiment, the industrial lighting device 1 has four lighting modules 11. In another embodiment, the industrial lighting device 1 may have only one lighting module 11 or more than four lighting modules 11. The number of lighting modules 11 can be adjusted according to actual needs. In another embodiment, the two ends of the suspension bracket 13 may be directly connected to the two side covers 12.

Each lighting module 11 includes a base 111, two light source boards 112, and a lens 113. The two light source boards 112 are disposed on the base 111. The two side covers 12 are disposed at the two ends of the base 111, respectively. Each light source board 112 includes a circuit board 1121 and a plurality of light sources 1122. The light sources 1122 may be light-emitting diodes (LEDs). In addition, each lighting module 11 further includes two sealing pads 114. The two sealing pads 114 are disposed at the two ends of the lens 113, respectively, to achieve waterproof and dustproof effects.

The lens 113 is disposed on the base 111 and covers the light source board 112. The lens 113 includes two optical modules 1131 and two curved arms 1132. The optical modules 1131 are corresponding to the two light source boards 112, respectively. In another embodiment, the lens 113 may include only one optical module 1131 or more than two optical modules 1131 (the number of light source boards 112 is the same as the number of optical modules 1131). The number of optical modules 1131 can be adjusted according to actual needs. The lens 113 may be made of transparent or translucent materials, such as plastic, glass, etc.

The embodiment just exemplifies the present invention and is not intended to limit the scope of the present invention; any equivalent modification and variation according to the spirit of the present invention is to be also included within the scope of the following claims and their equivalents.

Figure 5:
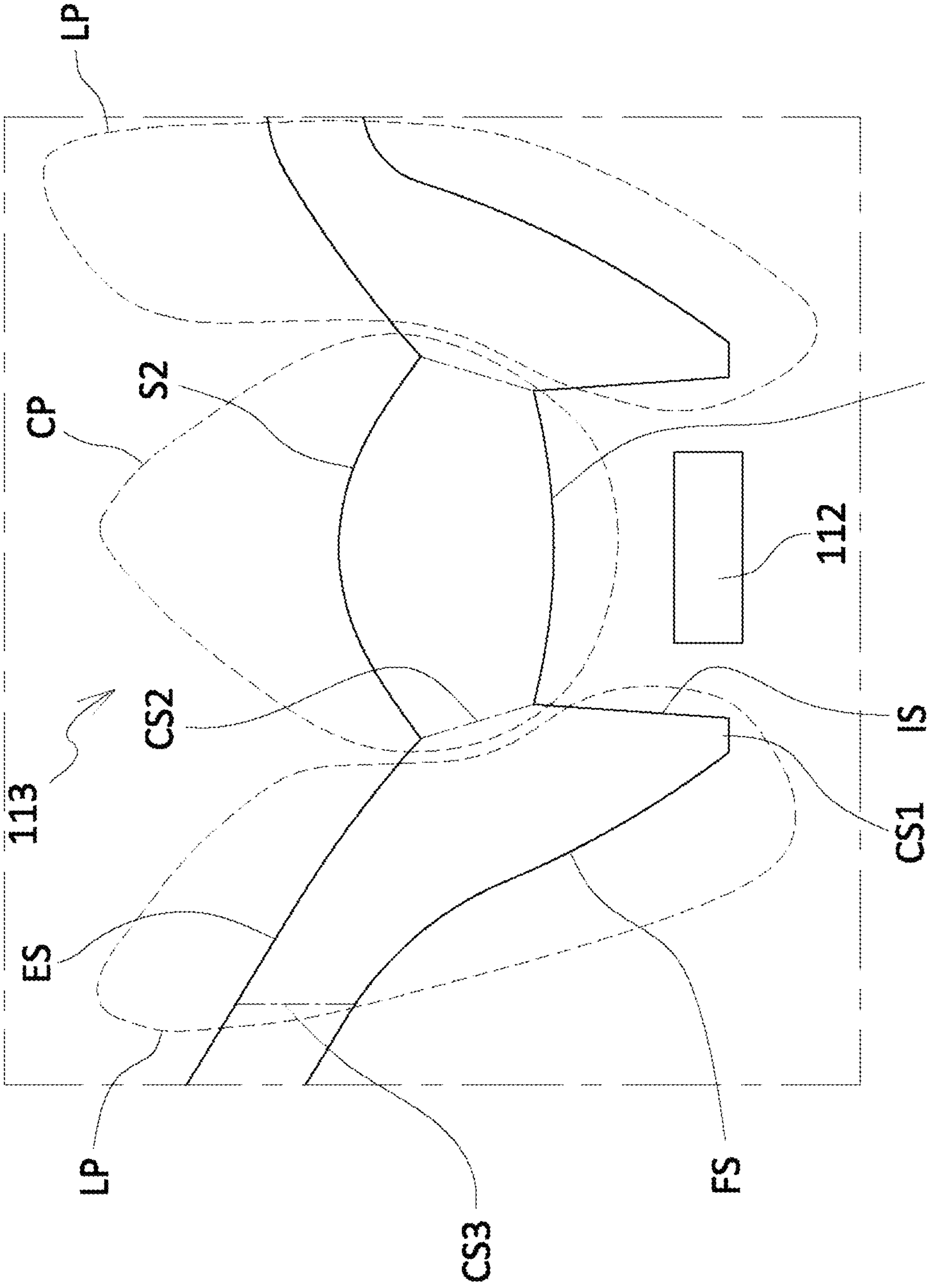
FIG. 5 is a sectional view of an optical module of a lens of the high luminous-efficacy industrial lighting device in accordance with one embodiment of the present invention.
Figure 6:
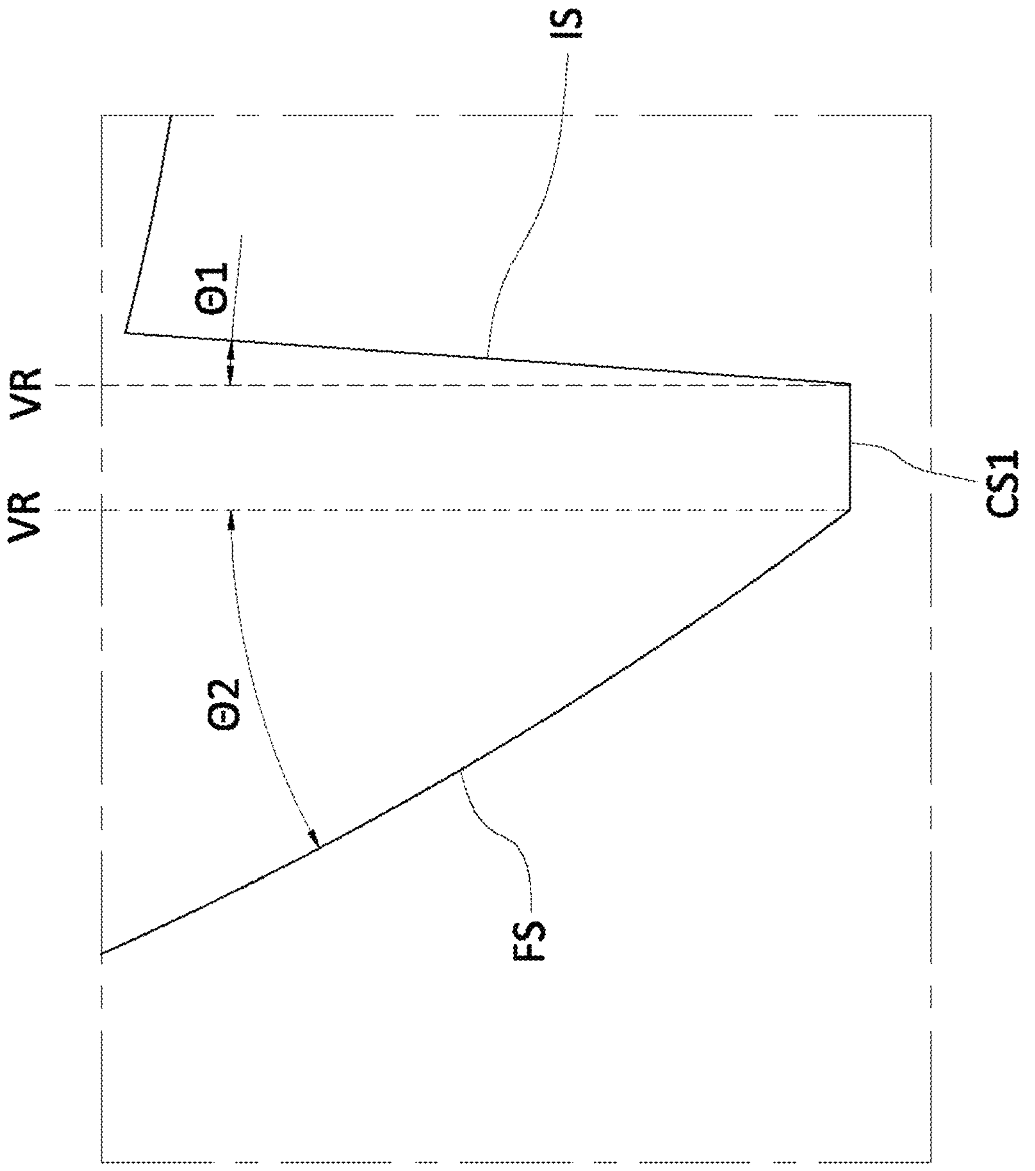
FIG. 6 is a partial enlargement view of the optical module of the lens of the high luminous-efficacy industrial lighting device in accordance with one embodiment of the present invention.

Please refer to FIG. 5 and FIG. 6, and also refer to FIG. 1 to FIG. 4. FIG. 5 is a sectional view of an optical module of a lens of the high luminous-efficacy industrial lighting device in accordance with one embodiment of the present invention. FIG. 6 is a partial enlargement view of the optical module of the lens of the high luminous-efficacy industrial lighting device in accordance with one embodiment of the present invention. As shown in FIG. 5 and FIG. 6, each optical module 1131 includes a central portion CP and two side portions LP. The side portions LP are disposed on the two sides of the central portion CP, respectively, forming an accommodation space between the central portion CP and the two side portions LP. The light source board 112 corresponding to this optical module 1131 is disposed in the accommodation space and faces the central portion CP.

Taking the left optical module 1131 as an example, the curvature of the side S1, adjacent to the light source board 112, of the central portion CP of this optical module 1131 is less than the curvature of the other side S2 of the central portion CP; therefore, the optical module 1131 adopts an asymmetric structural design and is not limited by holding pressure time. The left side portion LP of this optical module 1131 includes interconnected light entrance surface IS, reflection surface FS, light exit surface ES, first connecting surface CS1, second connecting surface CS2, and third connecting surface CS3. The first connecting surface CS1 is disposed between the light entrance surface IS and the reflection surface FS, and contacts the base 111. The second connecting surface CS2 is disposed between the light entrance surface IS and the light exit surface ES, and is connected to the central portion CP. The third connecting surface CS3 is disposed between the reflection surface FS and the light exit surface ES, and is connected to one of the curved arms 1132. The angle θ1 between the light entrance surface IS and the vertical reference line VR is less than the angle θ2 between the reflection surface FS and the vertical reference line VR.

The right side portion LP (the other side portion LP of this optical module 1131) has the same structure. However, since the lens 113 in this embodiment has two optical modules 1131, the third connecting surface CS3 of the right side portion LP of this optical module 1131 is connected to the right optical module 1131, and the right optical module 1131 is connected to the other curved arm 1132. If the lens 113 has only one optical module 1131, the third connecting surface CS3 of the right side portion LP of this optical module 1131 is connected to the other curved arm 1132. The number of optical modules 1131 can be varied according to actual needs. In another embodiment, the lens 113 may have three or more optical modules 1131.

Through the above structural design, the lens 113 can be fixed on the base 111, ensuring a distance between the central portion CP of the optical module 1131 and the light source board 112.

The embodiment just exemplifies the present invention and is not intended to limit the scope of the present invention; any equivalent modification and variation according to the spirit of the present invention is to be also included within the scope of the following claims and their equivalents.

Figure 7:
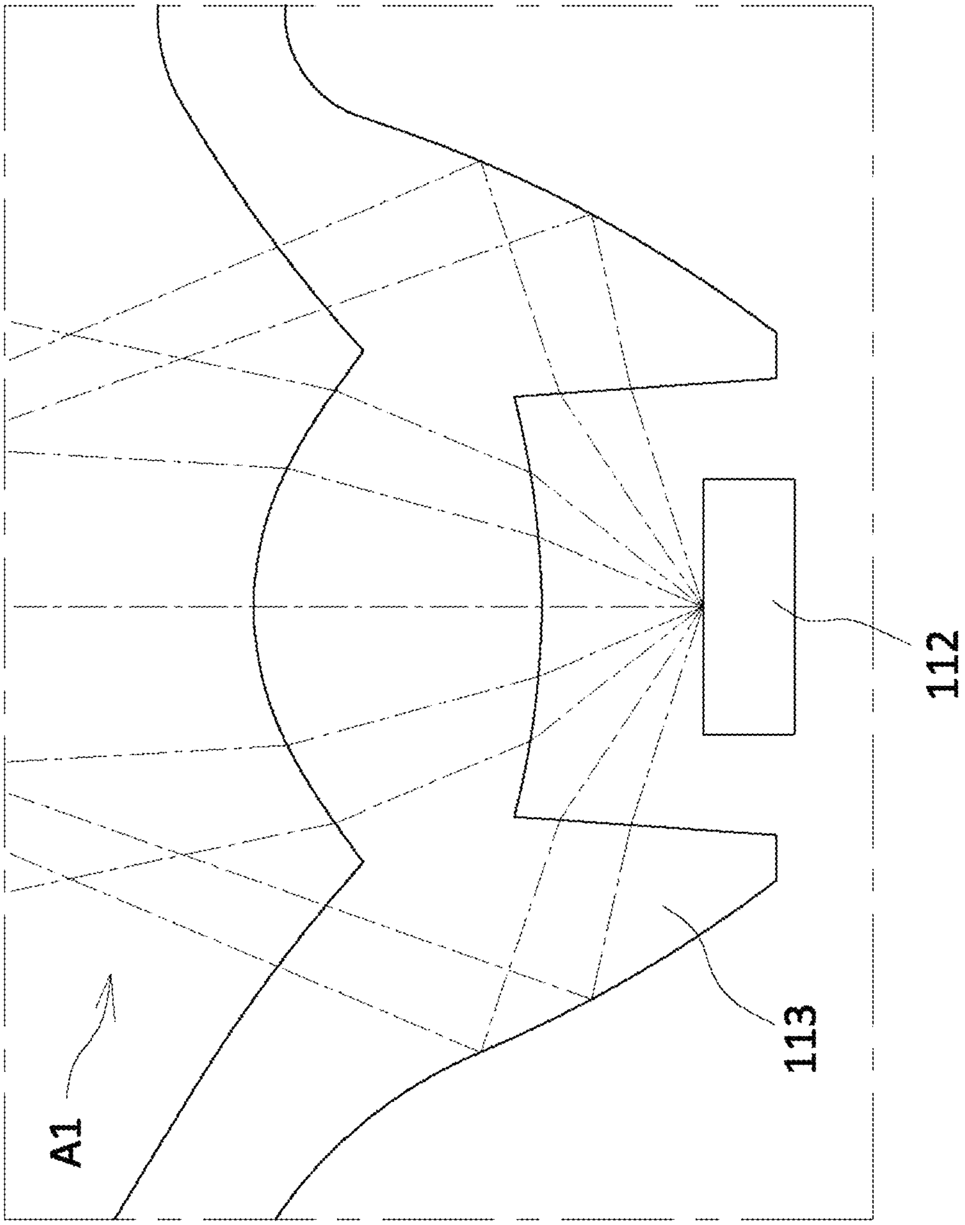
FIG. 7 is a schematic view of an operating state of the optical module of the lens of the high luminous-efficacy industrial lighting device in accordance with one embodiment of the present invention.

Please refer to FIG. 7, which is a schematic view of an operating state of the optical module of the lens of the high luminous-efficacy industrial lighting device in accordance with one embodiment of the present invention, and also refer to FIG. 5 to FIG. 6. As shown in FIG. 7, a portion of the light emitted from the light source board 112 (as indicated by arrow A1 in FIG. 7) passes through the central portion CP. After passing through the central portion CP, this portion of light converges toward the center to a certain extent, achieving a light-condensing effect.

Another portion of the light emitted from the light source board 112 passes through the two side portions LP. After passing through the light entrance surface IS of either side portion LP, this portion of light is reflected by the reflection surface FS and then exits through the light exit surface ES. As mentioned earlier, the angle θ2 between the reflection surface FS and the vertical reference line VR is greater than the angle θ1 between the light entrance surface IS and the vertical reference line VR. Thus, when light reaches the reflection surface FS, its incident angle may exceed the critical angle. Thus, light does not pass through the reflection surface FS, but is reflected by the reflection surface FS (total internal reflection). This reflected light also converges toward the center to a certain extent. Since the two side portions LP are symmetrical, the light distribution becomes more uniform.

As described above, the central portion CP of each optical module 1131 achieves a light-condensing effect, while its two side portions LP provide a reflective effect. Through this composite optical structure and the asymmetric design of the central portion CP, the light-concentrating effect of the optical module 1131 is significantly improved, reducing optical loss and enabling uniform distribution of light emitted from the light source board 112 onto the target area. Consequently, both the luminous efficacy and brightness of the industrial lighting device 1 can be substantially enhanced.

As previously mentioned, the lens 113 of the lighting module 11 includes the optical module 1131, and each side portion LP of the optical module 1131 further includes a first connecting surface C1, second connecting surface C2, and third connecting surface C3. The first connecting surface C1 is located between the light entrance surface IS and reflection surface FS and contacts the base 111. The second connecting surface C2 is located between the light entrance surface IS and light exit surface ES and connects to the central portion CP. The third connecting surface C3 is located between the reflection surface FS and light exit surface ES. Through this structural design, the lens 113 is securely fixed to the base 111, maintaining a predetermined distance between the central portion CP of the optical module 1131 and the light source board 112, thereby optimizing the performance of the composite optical structure.

The embodiment just exemplifies the present invention and is not intended to limit the scope of the present invention; any equivalent modification and variation according to the spirit of the present invention is to be also included within the scope of the following claims and their equivalents.

Figure 8:
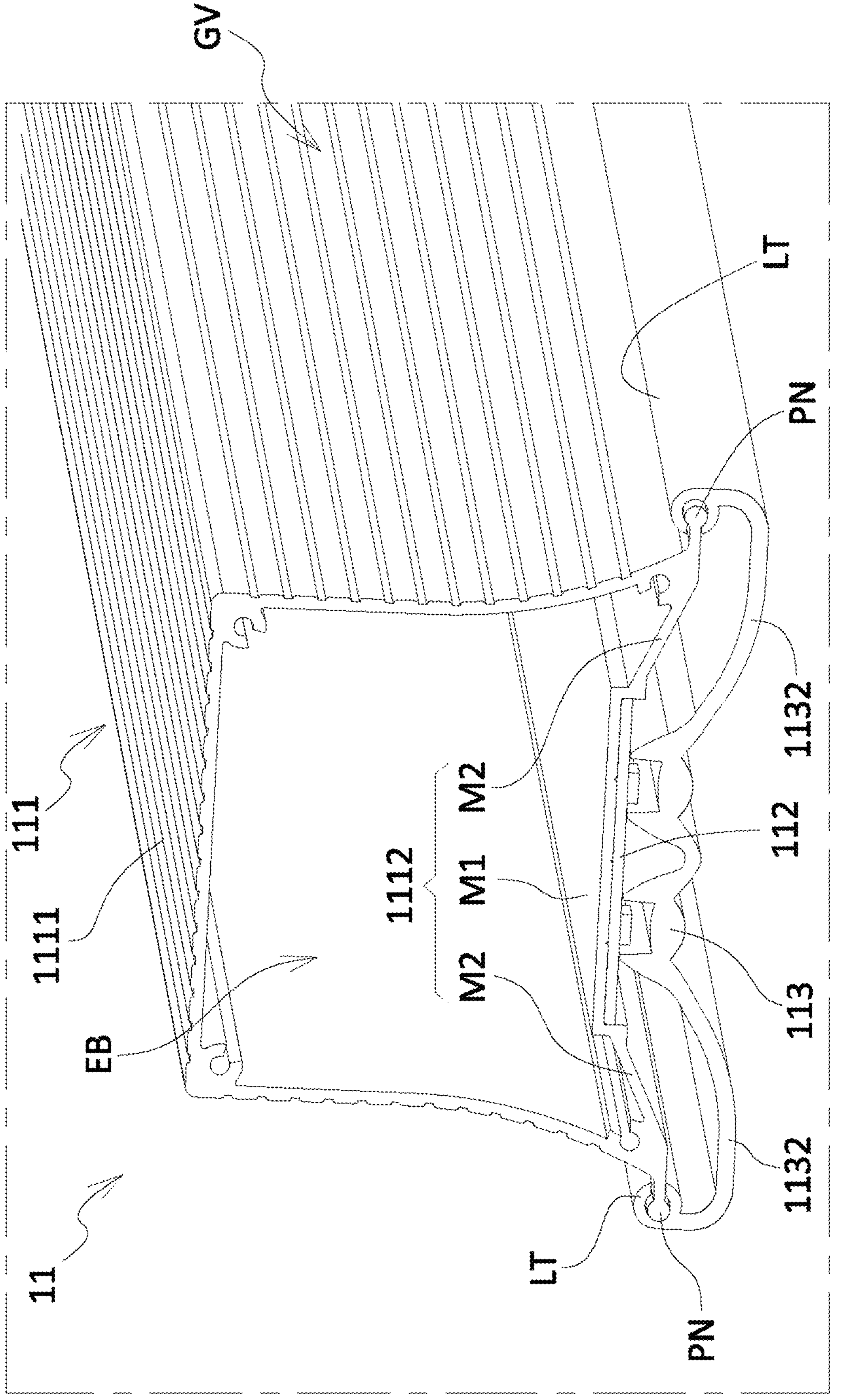
FIG. 8 is a schematic view of a lighting module of the optical module of the lens of the high luminous-efficacy industrial lighting device in accordance with one embodiment of the present invention.

Please refer to FIG. 8, which is a schematic view of a lighting module of the optical module of the lens of the high luminous-efficacy industrial lighting device in accordance with one embodiment of the present invention. As shown in FIG. 8, the base 111 of the lighting module 11 includes a housing 1111 and a bottom plate 1112 connected with each other. A cavity EB is formed between the housing 1111 and bottom plate 1112, which can accommodate a power module, wiring, and other necessary components. Thus, the user may place additional components within the cavity EB according to practical needs, enhancing the flexibility and broadening the applications of the industrial lighting device 1.

The housing 1111 has two protrusion portions PN respectively disposed on the two sides thereof. Each curved arm 1132 has a clamping groove LT on one side corresponding to one protrusion portion PN. Each protrusion portion PN is engaged with the corresponding clamping groove LT, enabling the two sides of the housing 1111 to be engaged with the two curved arms 1132 respectively.

The bottom plate 1112 includes a central plate M1 and two inclined wing portions M2 disposed on the two sides of the central plate M1. This configuration allows the bottom plate 1112 to match the shape of the lens 113. Through this structural design, a gap is maintained between the curved arms 1132 and the bottom plate 1112, providing flexibility during assembly to effectively compensate for manufacturing tolerances, improve assembly precision, and reduce labor requirements. Consequently, the manufacturing cost of the industrial lighting device 1 is effectively reduced.

Furthermore, the surface of the housing 1111 is provided with a plurality of recesses GV. These recesses GV significantly increase the heat dissipation area, substantially improving the heat dissipation effect of the lighting module 11. This design extends the service life of the industrial lighting device 1. Additionally, the recesses GV provide scratch-resistant properties, making scratches on the housing 1111 less noticeable, thereby better meeting actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that currently available mining lamps usually employ spherical lenses, which require injection molding for production. To ensure the curvature of the lens surface meets design requirements, an extended holding pressure time is necessary, which significantly increases manufacturing costs. Additionally, the assembly process for spherical lenses is relatively complex. Whether using snap-fit installation or screw fastening, substantial labor is required, which further drives up production costs. Moreover, insufficient holding pressure time during injection molding can greatly affect the light-emitting angle of spherical lenses while also compromising the brightness of mining lamps. By contrast, according to one embodiment of the present invention, the industrial lighting device includes at least one lighting module. The lighting module includes a base, a light source board and a lens. The light source board is disposed on the base. The lens is disposed on the base and covers the light source board. The lens includes an optical module including a central portion and two side portions respectively disposed on the two sides of the central portion, such that an accommodation space is formed between the central portion and the side portions. The light source board is disposed within the accommodation space and faces the central portion. The curvature of one side, adjacent to the light source board, of the central portion is less than the curvature of the other side of the central portion. Each of the side portions includes a light entrance surface, a reflection surface, and a light exit surface. The light emitted from the light source board passes through the light entrance surface, is then reflected by the reflection surface, and exits through the light exit surface. As a result, the central portion achieves a light-condensing effect, while the side portions provide a reflective effect. Through this composite optical structure and the asymmetrical design of the central portion, the light-concentrating effect of the optical module is significantly improved, reducing optical loss and enabling uniform distribution of light emitted from the light source board onto a target area. Consequently, both the luminous efficacy and brightness of the industrial lighting device can be substantially enhanced.

According to one embodiment of the present invention, the lens of the lighting module includes an optical module, and each side portion of the optical module further includes a first connecting surface, a second connecting surface, and a third connecting surface. The first connecting surface is disposed between the light entrance surface and the reflection surface, and contacts the base. The second connecting surface is disposed between the light entrance surface and the light exit surface, and connected to the central portion. The third connecting surface is disposed between the reflection surface and the light exit surface. Through this structural design, the lens is securely fixed to the base, ensuring a predetermined distance between the central portion of the optical module and the light source board with a view to optimizing the performance of the composite optical structure.

Also, according to one embodiment of the present invention, the lens of the lighting module includes two curved arms. One curved arm is connected to the third connecting surface of one side portion, while the other curved arm is connected to the third connecting surface of the other side portion. The base includes a housing and a bottom plate interconnected with each other. The two sides of the housing are respectively engaged with the two curved arms. This structural configuration provides a gap between the curved arms and the bottom plate, introducing flexibility during assembly to effectively compensate for manufacturing tolerances, improve assembly precision, and reduce labor requirements. Thus, the manufacturing cost of the industrial lighting device can be effectively reduced.

Moreover, according to one embodiment of the present invention, the base of the lighting module includes a housing and a bottom plate connected with each other. A cavity is formed between the housing and the bottom plate to accommodate a power module, wiring, and other necessary components. The user can place additional components within the cavity based on practical needs. Therefore, the industrial lighting device can be more flexible in use and more comprehensive in application.

Further, according to one embodiment of the present invention, the base of the lighting module comprises a housing and a bottom plate connected with each other. The housing surface is provided with a plurality of recesses, which significantly increase the heat dissipation area, thereby improving the heat dissipation effect of the lighting module. This design extends the service life of the industrial lighting device. Additionally, the recesses provide scratch-resistant properties, making scratches on the housing less noticeable. Thus, the industrial lighting device can meet actual requirements.

Furthermore, according to one embodiment of the present invention, the industrial lighting device further includes two side covers and two directional adjustment plates. The two side covers are respectively disposed at the two ends of the base, while the two ends of the suspension bracket are connected to the side covers via the directional adjustment plates. Through this structural design of the directional adjustment plates, the user can adjust the light-emitting angle of the industrial lighting device as needed. Accordingly, the industrial lighting device can conform the requirements of different applications. As set forth above, the industrial lighting device according to the embodiments of the present invention can definitely achieve great technical effects.

Figure 9:
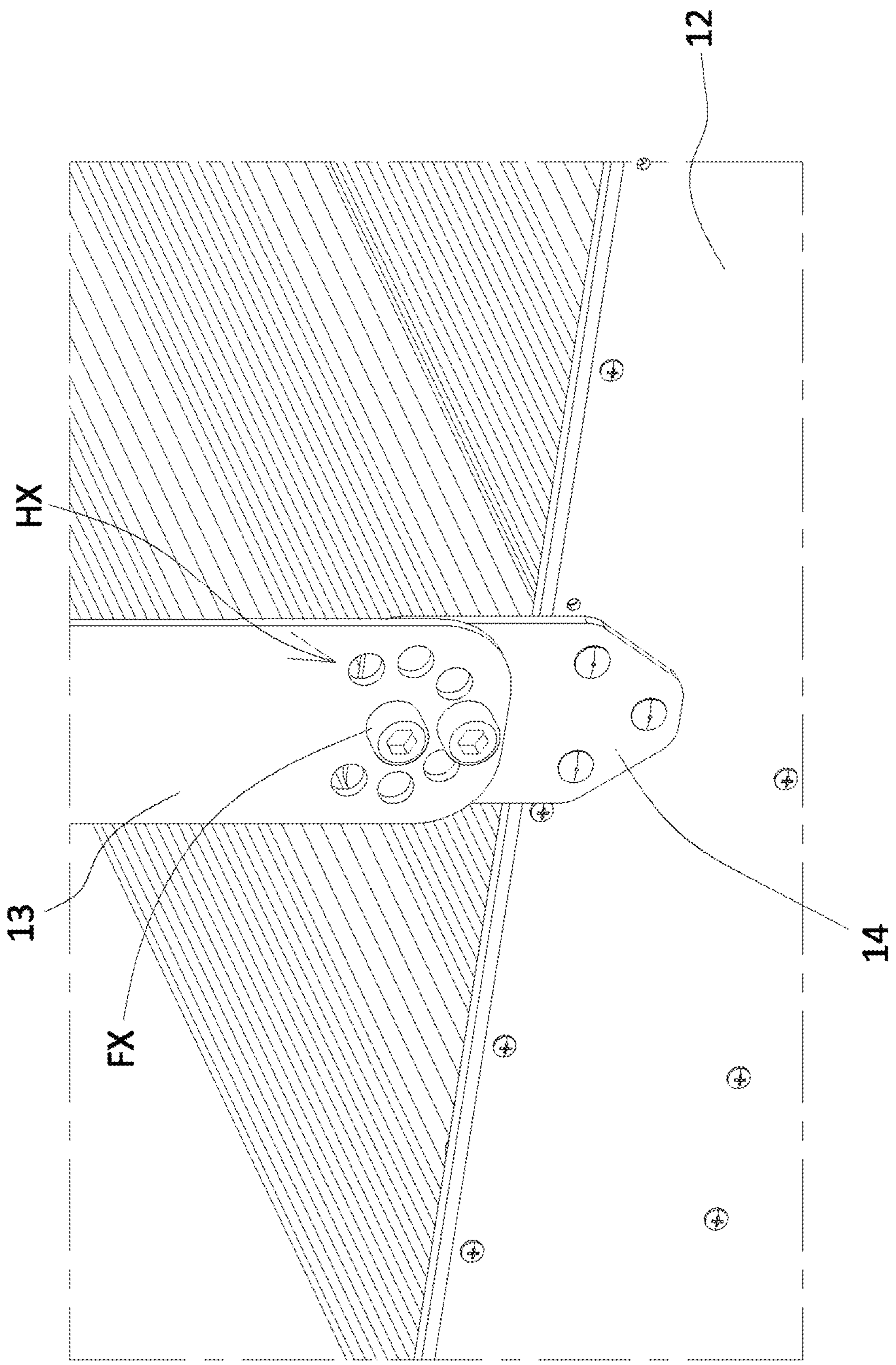
FIG. 9 is a first schematic view of an operating state of the high luminous-efficacy industrial lighting device in accordance with one embodiment of the present invention.
Figure 10:
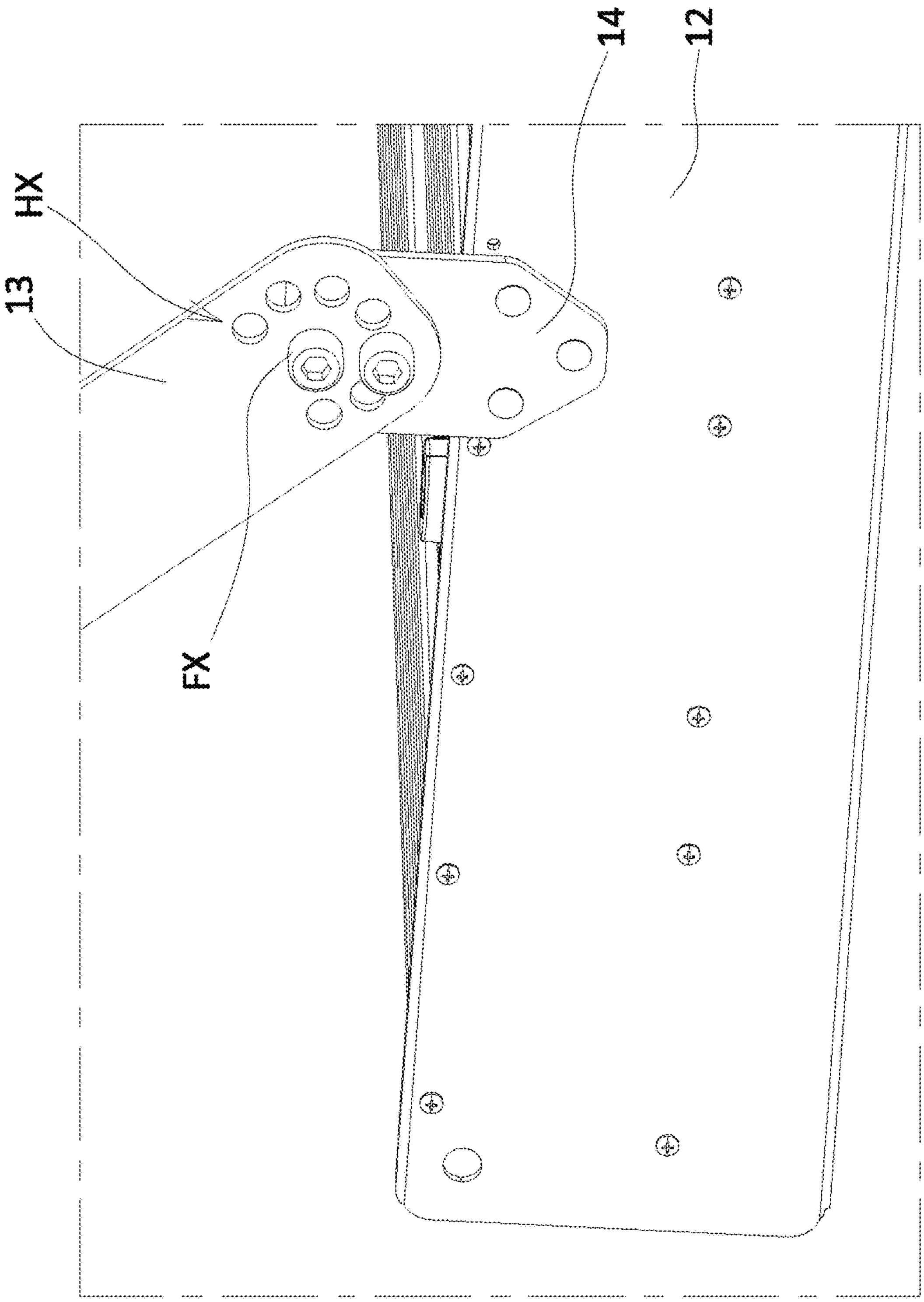
FIG. 10 is a second schematic view of the operating state of the high luminous-efficacy industrial lighting device in accordance with one embodiment of the present invention.

Please refer to FIG. 9 and FIG. 10. FIG. 9 is a first schematic view of an operating state of the high luminous-efficacy industrial lighting device in accordance with one embodiment of the present invention. FIG. 10 is a second schematic view of the operating state of the high luminous-efficacy industrial lighting device in accordance with one embodiment of the present invention. As shown in FIG. 9, the two ends of the suspension bracket 13 are connected to the two side covers 12 via the directional adjustment plates 14, respectively. Each end of the suspension bracket 13 is provided with a plurality of directional adjustment holes HX, and each directional adjustment plate 14 has at least two holes. Therefore, the user can secure the suspension bracket 13 to the two directional adjustment plates 14 using one or more fasteners FX.

The embodiment just exemplifies the present invention and is not intended to limit the scope of the present invention; any equivalent modification and variation according to the spirit of the present invention is to be also included within the scope of the following claims and their equivalents.

As shown in FIG. 10, the user may select different directional adjustment holes HX to adjust the angle of the suspension bracket 13, thereby changing the light-emitting angle of the industrial lighting device 1. Through this structural design of the directional adjustment plates 14, the user can appropriately adjust the light-emitting angle of the industrial lighting device 1. Consequently, the industrial lighting device 1 can meet the requirements of different applications.

As previously described, the lighting module 11 of the industrial lighting device 1 includes a base 111, a light source board 112, and a lens 113. The light source board 112 is disposed on the base 111. The lens 113 is disposed on the base 111 and covers the light source board 112. The lens 113 includes an optical module 1131, which comprises a central portion CP and two side portions LP. The two side portions LP are respectively disposed on the two sides of the central portion CP, forming an accommodation space between the central portion CP and the side portions LP. The light source board 112 is disposed within the accommodation space and faces the central portion CP. The curvature of the side of the central portion CP adjacent to the light source board 112 is less than that of the opposite side of the central portion CP. Each side portion LP includes a light entrance surface IS, a reflection surface FS, and a light exit surface ES. Light emitted from the light source board 112 passes through the light entrance surface IS, is reflected by the reflection surface FS, and then exits through the light exit surface ES. Thus, the central portion CP achieves a light-condensing effect while the side portions LP provide a reflective effect. Through this composite optical structure and the asymmetrical design of the central portion CP, the light-concentrating efficiency of the optical module 1131 is significantly improved, reducing optical loss and enabling uniform distribution of light emitted from the light source board 112 onto the target area. Therefore, both the luminous efficacy and brightness of the industrial lighting device 1 can be substantially enhanced.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the industrial lighting device includes at least one lighting module. The lighting module includes a base, a light source board and a lens. The light source board is disposed on the base. The lens is disposed on the base and covers the light source board. The lens includes an optical module including a central portion and two side portions respectively disposed on the two sides of the central portion, such that an accommodation space is formed between the central portion and the side portions. The light source board is disposed within the accommodation space and faces the central portion. The curvature of one side, adjacent to the light source board, of the central portion is less than the curvature of the other side of the central portion. Each of the side portions includes a light entrance surface, a reflection surface, and a light exit surface. The light emitted from the light source board passes through the light entrance surface, is then reflected by the reflection surface, and exits through the light exit surface. As a result, the central portion achieves a light-condensing effect, while the side portions provide a reflective effect. Through this composite optical structure and the asymmetrical design of the central portion, the light-concentrating effect of the optical module is significantly improved, reducing optical loss and enabling uniform distribution of light emitted from the light source board onto a target area. Consequently, both the luminous efficacy and brightness of the industrial lighting device can be substantially enhanced.

According to one embodiment of the present invention, the lens of the lighting module includes an optical module, and each side portion of the optical module further includes a first connecting surface, a second connecting surface, and a third connecting surface. The first connecting surface is disposed between the light entrance surface and the reflection surface, and contacts the base. The second connecting surface is disposed between the light entrance surface and the light exit surface, and connected to the central portion. The third connecting surface is disposed between the reflection surface and the light exit surface. Through this structural design, the lens is securely fixed to the base, ensuring a predetermined distance between the central portion of the optical module and the light source board with a view to optimizing the performance of the composite optical structure.

Also, according to one embodiment of the present invention, the lens of the lighting module includes two curved arms. One curved arm is connected to the third connecting surface of one side portion, while the other curved arm is connected to the third connecting surface of the other side portion. The base includes a housing and a bottom plate interconnected with each other. The two sides of the housing are respectively engaged with the two curved arms. This structural configuration provides a gap between the curved arms and the bottom plate, introducing flexibility during assembly to effectively compensate for manufacturing tolerances, improve assembly precision, and reduce labor requirements. Thus, the manufacturing cost of the industrial lighting device can be effectively reduced.

Moreover, according to one embodiment of the present invention, the base of the lighting module includes a housing and a bottom plate connected with each other. A cavity is formed between the housing and the bottom plate to accommodate a power module, wiring, and other necessary components. The user can place additional components within the cavity based on practical needs. Therefore, the industrial lighting device can be more flexible in use and more comprehensive in application.

Further, according to one embodiment of the present invention, the base of the lighting module comprises a housing and a bottom plate connected with each other. The housing surface is provided with a plurality of recesses, which significantly increase the heat dissipation area, thereby improving the heat dissipation effect of the lighting module. This design extends the service life of the industrial lighting device. Additionally, the recesses provide scratch-resistant properties, making scratches on the housing less noticeable. Thus, the industrial lighting device can meet actual requirements.

Furthermore, according to one embodiment of the present invention, the industrial lighting device further includes two side covers and two directional adjustment plates. The two side covers are respectively disposed at the two ends of the base, while the two ends of the suspension bracket are connected to the side covers via the directional adjustment plates. Through this structural design of the directional adjustment plates, the user can adjust the light-emitting angle of the industrial lighting device as needed. Accordingly, the industrial lighting device can conform the requirements of different applications.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high luminous-efficacy industrial lighting device, comprising at least one lighting module, wherein the lighting module comprises:

a base;

a light source board disposed on the base; and a lens disposed on the base and covering the light source board, wherein the lens comprises an optical module comprising a central portion and two side portions respectively disposed on two sides of the central portion, whereby an accommodation space is formed between the central portion and the side portions, and the light source board is disposed within the accommodation space and faces the central portion;

wherein each of the side portions comprises a light entrance surface, a reflection surface, and a light exit surface, whereby a light emitted from the light source board passes through the light entrance surface, is then reflected by the reflection surface, and exits through the light exit surface, wherein each of the side portions further comprises a first connecting surface, a second connecting surface, and a third connecting surface, wherein the first connecting surface is disposed between the light entrance surface and the reflection surface, and contacts the base, wherein the second connecting surface is disposed between the light entrance surface and the light exit surface, and connected to the central portion, wherein the third connecting surface is disposed between the reflection surface and the light exit surface.

2. The high luminous-efficacy industrial lighting device as claimed in claim 1, wherein a curvature of one side, adjacent to the light source board, of the central portion is less than a curvature of another side of the central portion.

3. The high luminous-efficacy industrial lighting device as claimed in claim 1, wherein an angle between the light entrance surface and a vertical reference line is less than an angle between the reflection surface and the vertical reference line.

4. The high luminous-efficacy industrial lighting device as claimed in claim 1, wherein the lens further comprises two curved arms, wherein one of the curved arms is connected to the third connecting surface of one of the side portions, and another of the curved arms is connected to the third connecting surface of another of the side portions.

5. The high luminous-efficacy industrial lighting device as claimed in claim 4, wherein the base comprises a housing and a bottom plate connected to each other, and a cavity is formed between the housing and the bottom plate, and two sides of the housing are respectively engaged with the curved arms.

6. The high luminous-efficacy industrial lighting device as claimed in claim 1, further comprising two side covers respectively disposed at two ends of the base.

7. The high luminous-efficacy industrial lighting device as claimed in claim 6, further comprising a suspension bracket, wherein two ends of the suspension bracket are respectively connected to the side covers.

8. The high luminous-efficacy industrial lighting device as claimed in claim 7, further comprising two directional adjustment plates, wherein the two ends of the suspension bracket are respectively connected to the side covers via the directional adjustment plates.

* * * * *